Figure 1:
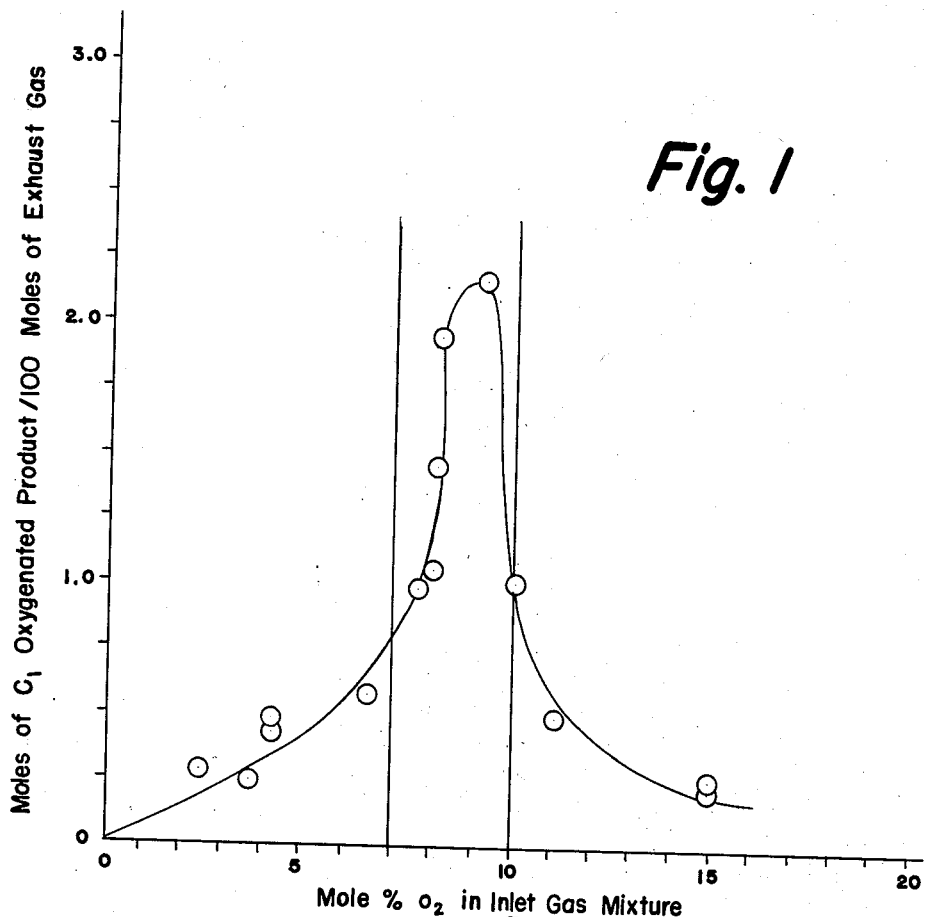

INVENTOR.
PAUL E. OBERDORFER JR.
BY
Robert O. Spurdle
ATTORNEY

United States Patent Office 2,922,809
Patented Jan. 26, 1960

2,922,809
PARTIAL OXIDATION OF METHANE IN A MOTORED ENGINE

Paul E. Oberdorfer, Jr., Claymont, Del., assignor to Sun Oil Company, Philadelphia, Pa., a corporation of New Jersey Application December 13, 1957, Serial No. 702,558

1 Claim. (Cl. 260—451)

This invention relates to the partial oxidation of methane, and more particularly to a process for conducting such an oxidation in a motored engine.

Processes for the manufacture of oxygenated compounds such as methanol, formaldehyde, and higher molecular weight alcohols, aldehydes, and ketones by the partial oxidation of normally gaseous petroleum hydrocarbons are known to the art. In a typical oxidation process the feed stock, which may be propane, butane or a natural gas rich in ethane and higher paraffins, is heated, at pressures in excess of 100 p.s.i.g., together with not more than 10% of its volume of oxygen, to a temperature of approximately 700° F., at which temperature oxidation of ethane and higher hydrocarbons is initiated, and the heated mixture is then passed through an open tube in which the reaction is carried to completion in from about 1 to 2 seconds. The amount of oxygen in the reaction mixture is regulated in a manner such that the maximum reaction temperature does not exceed about 900° F., since higher temperatures will induce rapid decomposition of the reaction products. The maximum permissible amount of oxygen which can be used depends on the heat capacity of the reaction mixture. Thus, if the hydrocarbon to be oxidized is butane, and the oxygen is supplied by air, up to 10% of oxygen may be employed. With propane as a feed stock, however, only about 6% of oxygen may be employed, and when operating with a high B.t.u. natural gas feed, which has a low heat capacity, only about 2% to 4% of oxygen is permissible, depending on the percentage of $C_2+$ hydrocarbons in the natural gas.

The reaction product resulting from partial oxidation of $C_2$ and higher hydrocarbons is an aqueous solution of a large number of organic compounds including acetaldehyde, acetone, dimethyl acetal, methanol, ethanol, isopropanol, and formaldehyde, which must be separated and purified. The purification problem is particularly acute with respect to the methanol and formaldehyde fractions separated from the reaction products by distillation, which contain small amounts of compounds of undetermined constitution, but which are probably unsaturated aldehydes, which impart an off-odor to the methanol, and which render the formaldehyde unfit for use in resin manufacture, since the resins produced from the crude formaldehyde have a very unpleasant odor. These contaminants cannot be separated from the methanol and formaldehyde by fractional distillation, so that it is necessary to subject these fractions to a series of expensive finishing steps, including solvent extraction and azeotropic distillation, in order to produce commercially saleable products.

For many years investigators have sought a method whereby methane could be directly oxidized to methanol and formaldehyde, since methane is a cheaper feed stock than the higher hydrocarbons, and since only $C_1$ oxygenated products would be formed from methane, the methanol and formaldehyde produced should be free from the annoying impurities found in the methanol and formaldehyde produced by the partial oxidation of $C_2$ and higher hydrocarbons. Efforts to produce a workable process for methane oxidation have heretofore been unsuccessful, although the production of trace quantities of oxygenated products from methane has been reported in the literature. It is believed that this failure to partially oxidize methane is due to the fact that methane is inert to oxygen at temperatures below about 900° F., the highest temperature heretofore used in commercial processes for the production of oxygenated hydrocarbons via the partial oxidation route, and reacts only at temperatures in excess of about 1000° F., at which temperature the reaction products are so unstable that they decompose before the temperature can be reduced below 900° F. by cooling means used by prior investigators.

I have now discovered a process for the partial oxidation of methane in which methanol, formaldehyde, and formic acid may be produced in good yields, without substantial degradation of the reaction products. I have found that these desirable results may be obtained by heating a feed stock, the hydrocarbon content of which is essentially methane, in admixture with from 7% to 10% oxygen to a temperature between 600° F. and 800° F., and passing the mixture to the inlet port of a motored engine having a compression ratio of at least 20:1 and preferably from about 40:1 to about 60:1. The compression ratio and preheat should be related to each other in a manner such that the maximum temperature developed in the reaction mixture during the compression stroke of the piston is from about 1200° F. to about 1400° F. For example, if the compression ratio of the engine is 40:1, a preheat temperature of about 675° F. will yield a maximum temperature of about 1200° F., whereas in a 20:1 compression ratio engine it is necessary to preheat the feed to almost 800° F. in order to achieve a comparable maximum temperature.

In order to minimize decomposition of reaction products it is essential that the time during which the reaction mixture is subjected to temperatures above 1000° F. (hereinafter referred to as the reaction time) be limited to 30 milliseconds or less, preferably from about 1 to about 15 milliseconds, after which the reaction mixture is rapidly cooled by expansion. The reaction time may be adjusted by adjusting the speed of the engine, or by adjusting the time at which the exhaust valve is opened. Thus, if the engine speed is 1000 r.p.m., if the exhaust valve is opened 90° after top dead center, the reaction time will be about 25 milliseconds, whereas if the exhaust valve is opened at 10° after top dead center, the reaction time will be about 11 milliseconds. If it is desired to operate the engine at 2000 r.p.m., the exhaust valve should be opened at 90° after top dead center in order to obtain a reaction time of about 13 milliseconds.

In order to obtain maximum yields of product, it is essential that the oxygen content of the feed be within the limits of 7% to 10%. The effect of oxygen concentration is illustrated in Fig. 1 of the accompanying drawing, which is a graph showing the relation of product yield to percent oxygen in the feed. The data from which the curve was derived were obtained at the following operating conditions: feed preheat, 700° F.; engine compression ratio, 40:1; and reaction time approximately 16 milliseconds. It will be observed that yields are low at oxygen percentages of less than 7% and at oxygen percentages in excess of 10%, but that there is a very sharp peak in production at oxygen percentages between 7% and 10%. Other series of runs under different operating conditions showed essentially the same effect. While the quantities of product produced varied with the operating conditions, the peak production was in all cases at oxygen percentages between 7 and 10.

The products may readily be recovered from the exhaust gas by scrubbing with cold liquid product previously recovered from the process, and the quantities which may be recovered are substantial, even though only a small percentage (about 2%) are present in the exhaust gas at optimum conditions. For example, a small single cylinder, four cycle motored engine having a cylinder diameter of five inches and a piston stroke of six inches, operated at 2000 r.p.m., will produce about 200 pounds of $C_1$ oxygenated products, calculated on an anhydrous basis, per day.

In order that those skilled in the art may more fully appreciate the nature of my invention and a method of carrying it out, it will be described in more detail in connection with Fig. 2 of the accompanying drawing, which is a diagrammatic flow sheet of an embodiment of the invention. Since the construction of motored engines and their associated driving engines is well known to those skilled in the art, no attempt has been made to illustrate any details of construction of these engines, in order to avoid cluttering up the specification with details unnecessary to an understanding of the invention.

Figure 2:
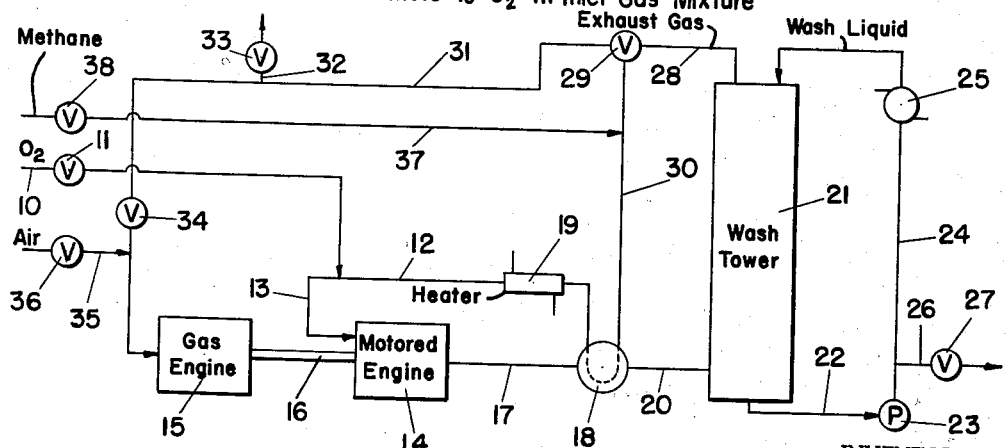

Referring now to Fig. 2, oxygen is taken from storage and is passed through line 10 under the control of valve 11 to admixture with a gas in line 12, the hydrocarbon content of which is essentially methane, in an amount such that the oxygen content of the mixture is between 7% and 10% by volume. The gas in line 12 has been previously heated, by means to be hereinafter described, to a temperature such that the temperature of the mixture is from about 600° F. to 800° F. The mixture is then passed through line 13 to the inlet end of motored engine 14, which has a compression ratio of from 20:1 to 60:1. Motored engine 14 is driven by gas engine 15, by means of drive shaft 16. The preheat given to the gas mixture in line 13 should be correlated with the compression ratio of the motored engine in a manner such that a maximum temperature is reached in motored engine 14 sufficient to cause the oxygen content of the feed to react with the methane present, but not so high that decomposition of the reaction products will be excessive. Preferred maximum temperatures are from 1200° F. to 1400° F. These temperatures may be attained by preheating the gas-oxygen mixture to slightly over 600° F. when operating with a 60:1 compression ratio, and to temperatures in the vicinity of 800° F. when operating at a 20:1 compression ratio, with intermediate preheat temperatures at intermediate compression ratios.

Motored engine 14 is driven at a speed such, and at an exhaust valve opening timing such that the reaction time is from about 1 millisecond to about 30 milliseconds. Since reaction temperature is reached at or beyond about 120° after bottom dead center, anyone skilled in the art may easily calculate the relationship between the speed and the time of opening the exhaust valve which will give the desired reaction time. For example, at 1000 r.p.m., if the exhaust valve is opened at 30° after top dead center, the reaction time will be about 15 milliseconds.

Exhaust gases, containing $C_1$ oxygenated reaction products, are taken from motored engine 14 through line 17 and are passed through heat exchanger 18 in countercurrent heat exchange with the gases in line 12, in order to impart preheat thereto. If insufficient heat can be imparted in this manner, auxiliary heating means 19 may be interposed in line 12. The cooled exhaust gases are then passed through line 20 to wash tower 21, in which they flow upwardly in countercurrent contact with cooled liquid product previously recovered from the process. This washing step substantially completely removes the $C_1$ oxygenated product and water produced in the reaction from the exhaust gases. The wash liquid is removed from the bottom of wash tower 21 through line 22 to pump 23, which returns the major portion of the wash liquid to the top of tower 21 through line 24 and cooler 25. An amount of liquid equal to that removed from the exhaust gas is bled from line 24 through line 26 under the control of valve 27 and is sent to storage for later processing to recover pure chemicals therefrom.

Exhaust gas, from which the $C_1$ oxygenated compounds produced in the reaction have been stripped, is removed from tower 21 through line 28 and is passed to proportioning valve 28, which diverts a portion of the gas to heat exchanger 18 through line 30 to serve as recycle feed to motored engine 14. The balance of the exhaust gas is taken through line 31, part of the gas in this line being taken off through line 32 under the control of valve 33 for use as fuel gas, while the balance, under the control of valve 34, is passed to gas engine 15 to serve as fuel therein. Air required for the operation of engine 15 is supplied through line 35 under the control of valve 36. The relative quantities of exhaust gas diverted to line 30, and bled off through line 32 will depend to a large extent on the inert gas and higher hydrocarbon content of the makeup methane introduced to line 30 through line 37 under the control of valve 38. If the make-up methane is essentially free of inert gases such as nitrogen or argon or higher hydrocarbons, no gas need be taken off through line 32, since the purpose of such withdrawal is to prevent excessive buildup of inert materials and higher hydrocarbons in the feed to motored engine 14. In this case, only enough methane will be admitted through line 37 to replace that consumed in the reaction. If, however, the methane feed contains a considerable amount of inert materials, necessitating withdrawal of exhaust gases through line 32, sufficient methane will be introduced through line 37 to replace that consumed in the reaction plus that withdrawn from the system through line 32.

In order to demonstrate the results which may be attained by the present invention, the following specific example is given:

EXAMPLE I

*Operating conditions*

Preheat _____ 710° F.
$O_2$ concentration _____ 8%.
Engine speed _____ 1000 r.p.m.
Compression ratio _____ 40:1.
Jacket temperature _____ 240° F.
Supercharge _____ ½ p.s.i.g.
Exhaust opens _____ 10° ATDC.

*Composition of feed and exhaust gases*

| | Mol. Percent Charge | Mol. Percent Exhaust |
|---|---|---|
| Methane | 75.1 | 70.6 |
| Ethane | 2.9 | 2.3 |
| Ethylene | 0.0 | 0.9 |
| Propane | 0.8 | 0.5 |
| Propylene | 0.0 | 0.2 |
| Isobutane | 0.2 | 0.1 |
| Butylenes | 0.0 | 0.1 |
| Isopentane | 0.1 | 0.1 |
| Oxygen | 8.1 | 4.5 |
| Nitrogen+CO | 7.6 | 8.5 |
| Argon | 4.6 | 4.6 |
| Hydrogen | 0.1 | 0.9 |
| $CO_2$ | 0.5 | 0.5 |
| Formaldehyde | 0.0 | 0.682 |
| Methanol | 0.0 | 1.013 |
| Formic Acid | 0.0 | 0.155 |
| Water | 0.0 | 1.2 |

It should be particularly noted that at the extremely short reaction time employed (about 11 milliseconds) the higher hydrocarbons such as ethane were not oxygenated, but were dehydrogenated to olefins, and the only oxygenated hydrocarbons produced had but one carbon atom, so that no problem, due to the presence of $C_2$ and higher oxygenated products, is presented in refining the liquid products recovered from the reaction.

By the terms "essentially methane," or "essentially free of higher hydrocarbons" I do not mean that no higher hydrocarbons are present in the feed to my process, since small amounts, up to 5% or so, may be tolerated. Therefore, when these terms are used in the specification and claim, they should be construed as covering methane admixed with small quantities of higher hydrocarbons.

The invention claimed is:

A process for the partial oxidation of methane which includes mixing a feed stock comprising methane, and essentially free of higher hydrocarbons, with from 7% to 10% oxygen by volume to form a reaction mixture, preheating the reaction mixture to a temperature of from about 600° F. to about 800° F., substantially adiabatically compressing the preheated reaction mixture to from one-twentieth to one-sixtieth of its volume at atmospheric pressure, correlating the preheat and degree of compression to yield a maximum reaction temperature of from about 1200° F. to about 1400° F., maintaining the reaction mixture at a temperature in excess of 1000° F. for a period of time between about 1 millisecond to about 30 milliseconds, reducing the pressure on the reaction mixture to about atmospheric pressure, and recovering $C_1$ oxygenated hydrocarbons from the reaction mixture.

References Cited in the file of this patent

UNITED STATES PATENTS

| | | |
|---|---|---|
| 2,376,668 | Derby | May 22, 1945 |
| 2,748,179 | Retailliau | May 29, 1956 |
| 2,767,203 | Rambosek et al. | Oct. 16, 1956 |